Figure 1:
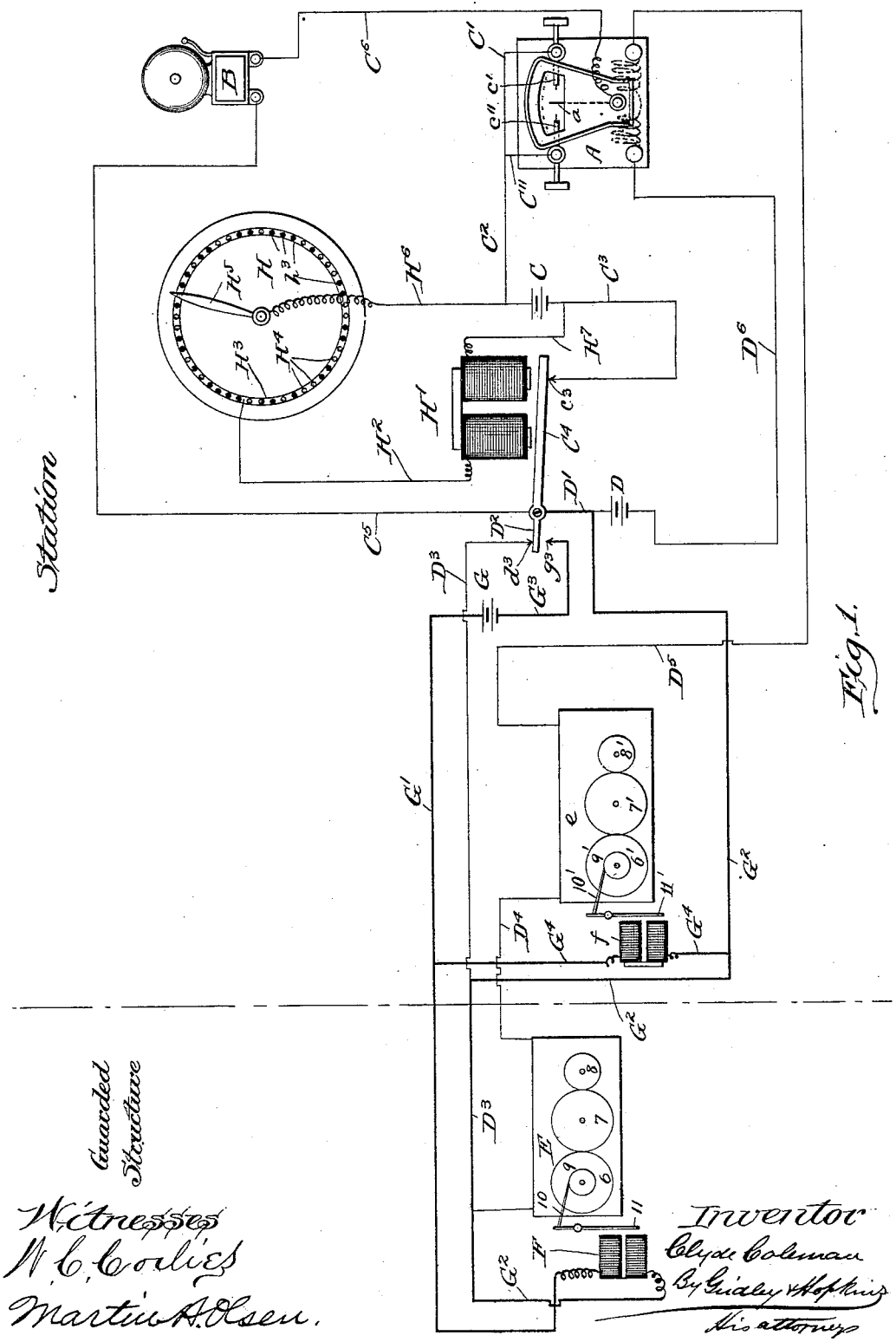

No. 632,512. Patented Sept. 5, 1899.
C. COLEMAN.
ELECTRIC BURGLAR ALARM.
(Application filed Sept. 28, 1896.)
(No Model.) 4 Sheets—Sheet 1.

No. 632,512. Patented Sept. 5, 1899.
C. COLEMAN.
ELECTRIC BURGLAR ALARM.
(Application filed Sept. 28, 1896.)
(No Model.) 4 Sheets—Sheet 2.
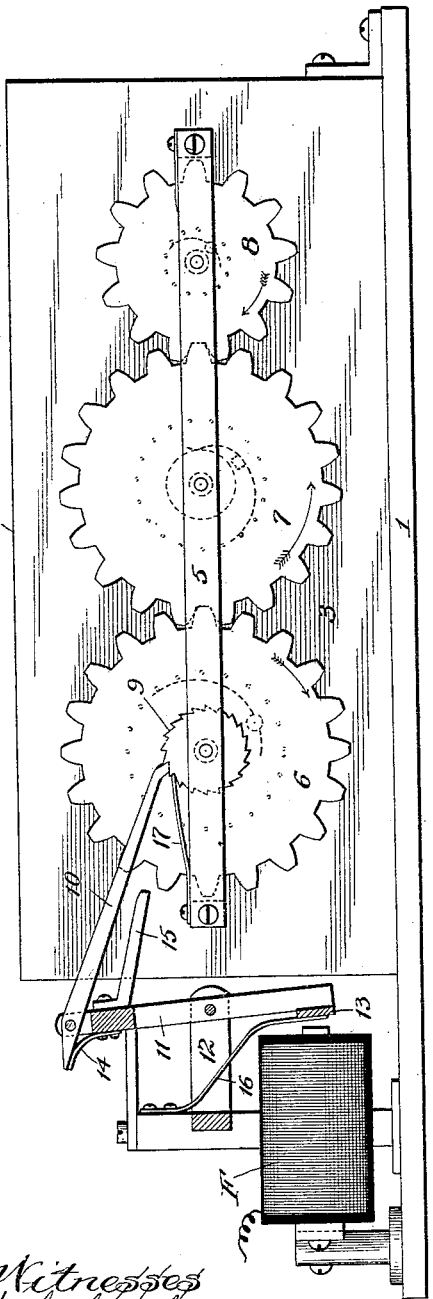
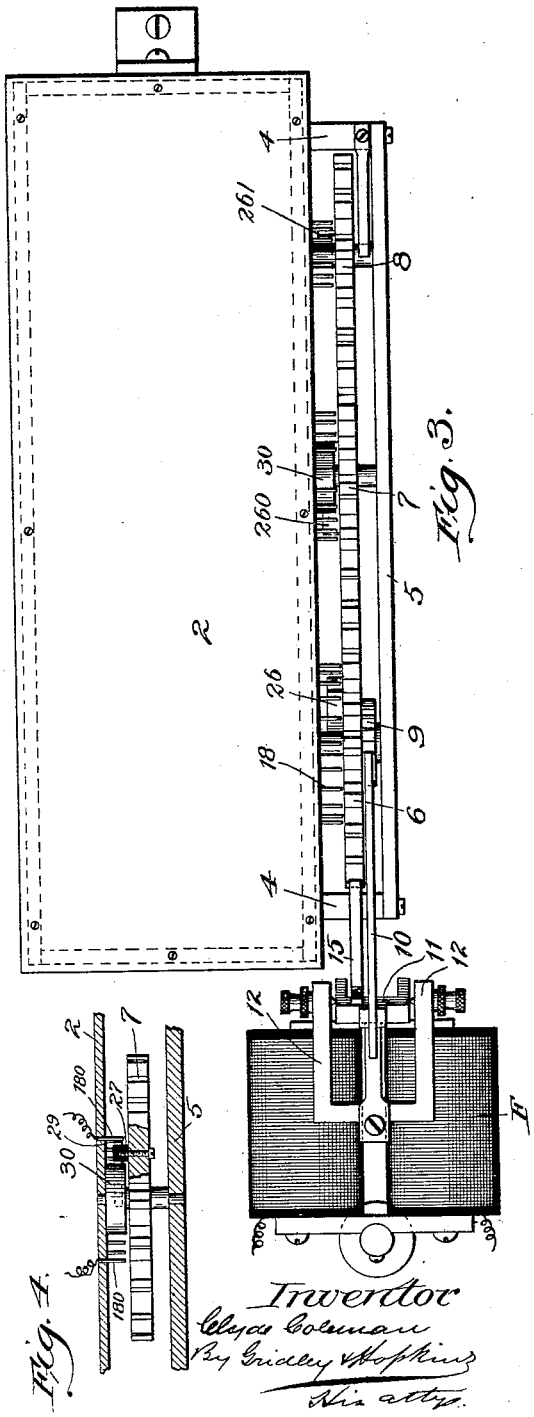

No. 632,512. Patented Sept. 5, 1899.
C. COLEMAN.
ELECTRIC BURGLAR ALARM.
(Application filed Sept. 28, 1896.)
(No Model.) 4 Sheets—Sheet 3.
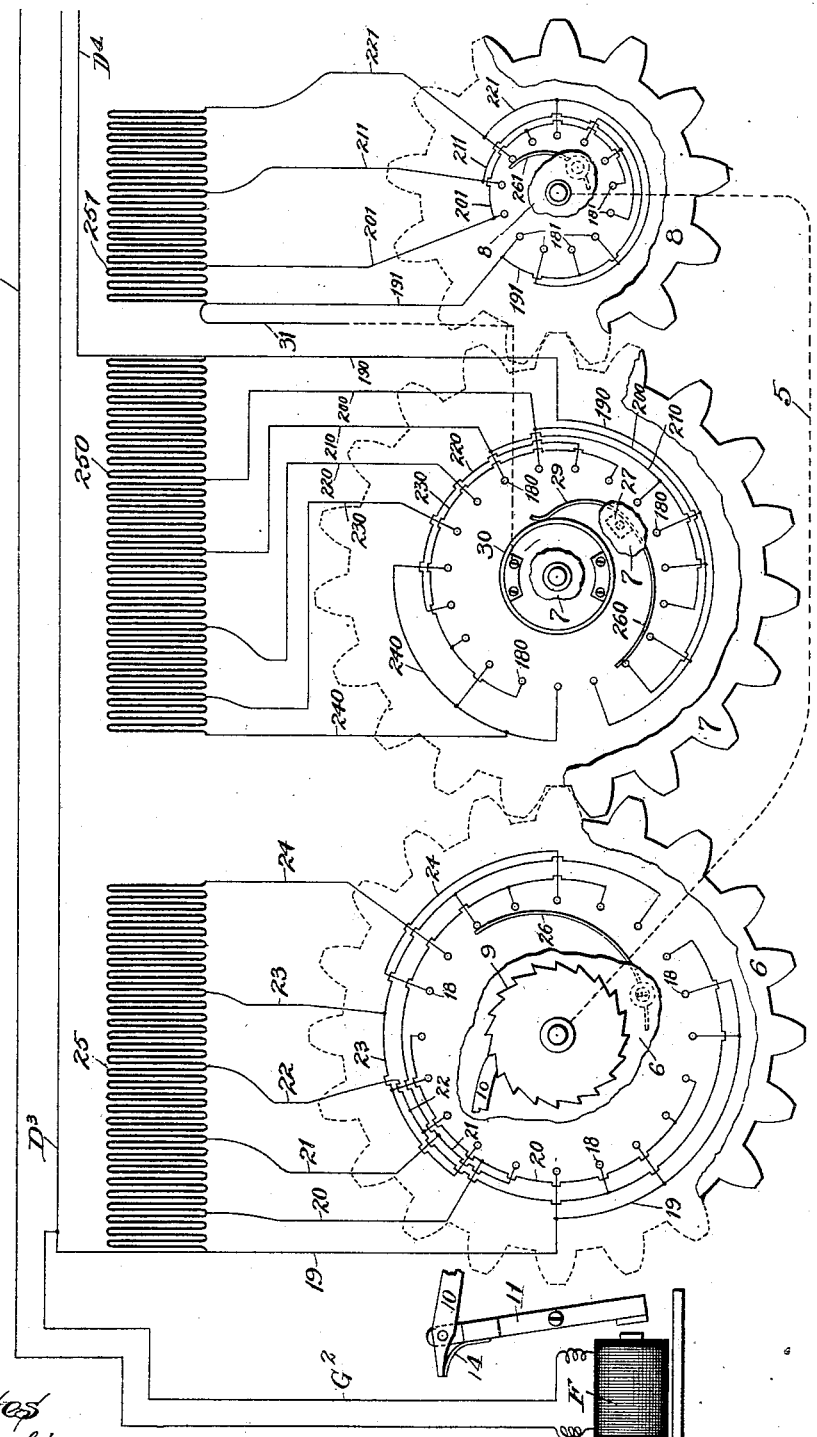

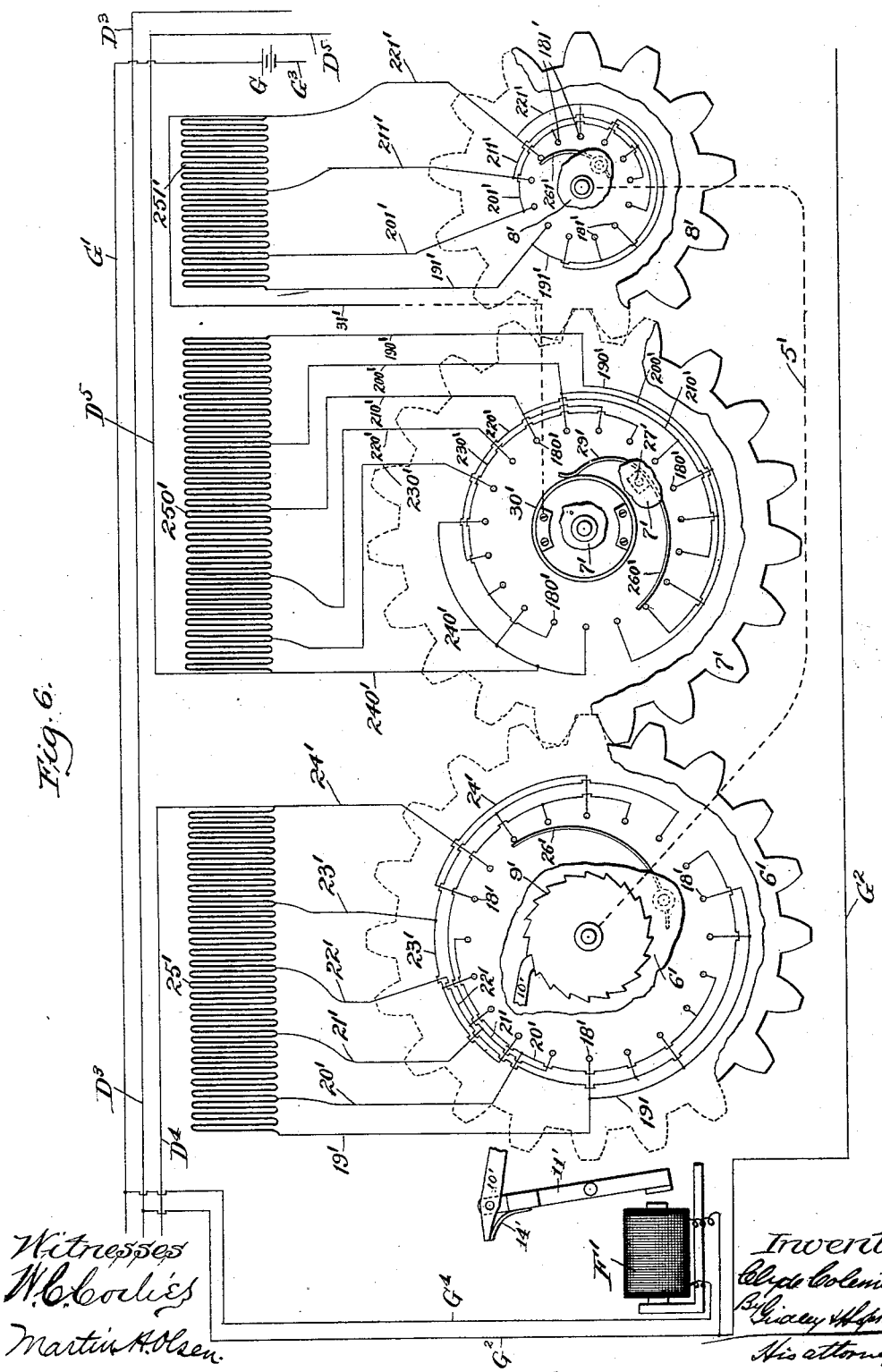

UNITED STATES PATENT OFFICE.

CLYDE COLEMAN, OF CHICAGO, ILLINOIS, ASSIGNOR, BY MESNE ASSIGN-
MENTS, OF TWO-THIRDS TO THE BANKERS ELECTRIC PROTECTIVE
COMPANY, OF SAME PLACE.

ELECTRIC BURGLAR-ALARM.

SPECIFICATION forming part of Letters Patent No. 632,512, dated September 5, 1899.

Application filed September 28, 1896. Serial No. 607,129. (No model.)

*To all whom it may concern:*

Be it known that I, CLYDE COLEMAN, a citizen of the United States, residing at Chicago, in the county of Cook and State of Illinois, have invented certain new and useful Improvements in Electrical Burglar-Alarms and in Rheostats for use in Burglar-Alarm and other Electrical Systems, of which the following is a specification.

The present invention relates in part to an electrical burglar-alarm system of that class in which there is a local alarm-circuit which is controlled by a circuit herein called the "main" or "controlling" circuit, and a device so related to said circuits that it is influenced by certain variations in the electrical condition of the main circuit, and when so influenced will give a signal or cause one to be given. More particularly stated, this part of the invention relates to that class of burglar-alarm systems in which the amount of resistance in the main circuit, considered in its entirety, remains constant, while the resistance in local portions of it is varied from time to time, such a system being shown and described in Letters Patent No. 554,505, which were issued to me on the 11th day of February, 1896.

The invention also relates in part to the construction of rheostats adapted for use in burglar-alarm and other electrical systems, especially in burglar-alarm systems of the class mentioned, and more particularly to that class of rheostats which I term "combination-rheostats."

In this specification I shall refer to the device which is so related to the main and signal circuits as to be controlled by the one and control the other as a "meter;" but the invention is not limited to a "meter" strictly so-called, this term as used in this specification being intended to comprehend any device that will be influenced by a variation in the resistance of the main circuit or a variation in the voltage or amperage of the current in the main circuit and when so influenced will give a signal or cause one to be given. The term "station" as used in this specification is intended to comprehend any place where it is desired to give a signal when the system is tampered with. The term "guarded structure" is intended to comprehend a safe, a building, or any part of a building or other structure or inclosure which it is desired to guard. The term "switch" comprehends any device, of whatever construction, for opening and closing a circuit or for diverting a current from one circuit or part thereof to another. The term "resistance" comprehends a coil or a part of a coil or other device used for resisting the current. The term "rheostat" comprehends the apparatus or mechanism including a resistance or resistances by which the amount of resistance in circuit is varied either by an increase or decrease. By "combination-rheostat" is meant a rheostat having a plurality of different resistances and means whereby they may be arranged in many different orders or combinations, or, in other words, "permutated," in one sense of the term. The term "reciprocating rheostats" means a plurality of rheostats or mechanisms, of whatever construction, one of which increases and the other of which decreases the amount of resistance in circuit, the increase and decrease being alike in amount, so that while the resistance in local portions of the circuit is varied the total resistance in the entire circuit remains constant.

The invention consists in the features of novelty that are particularly pointed out in the claims hereinafter, and in order that it may be fully understood I will describe it with reference to the accompanying drawings, which are made a part of this specification, and in which—

Figure 1 is a diagram of a burglar-alarm system embodying the invention. Figs. 2 and 3 are respectively a side elevation and a plan view of a rheostat constructed in accordance with the invention. Fig. 4 is a horizontal section of a portion thereof. Figs. 5 and 6 are views showing, partly in elevation and partly in diagram, rheostats constructed in accordance with the invention, Fig. 5 showing the rheostat that is located at the guarded structure, and Fig. 6 the rheostat that is located at the station, when said rheostats are embodied in a burglar-alarm embodying the invention.

A represents the device herein termed a

"meter." It is so constructed and connected with the main or controlling circuit that upon a variation in the current in said circuit it will close an alarm-circuit or in some other way cause an audible or visible signal to be given. In the drawings I have shown an alarm mechanism consisting of a magneto-electric bell B, operated by a battery C; but any other form of alarm mechanism or signaling device may, if desired, be used. As shown, the alarm-circuit comprises the needle $a$ or some other part of the meter, two contact screws or points $c'\ c''$, which are located upon opposite sides of the needle $a$ and in the path traveled thereby when in motion, two wires $C'\ C''$, connected with the screws $c'\ c''$, respectively, a wire $C^2$, leading therefrom to one pole of the battery, a wire $C^3$, leading from the other pole of the battery and terminating in a contact $c^3$, a switch $C^4$, constituting or carried by the armature of an electromagnet in the manner and for the purpose hereinafter described, a wire $C^5$, leading therefrom to one of the binding-posts of the bell B, and a wire $C^6$, leading from the other binding-post of the bell back to the needle of the meter. When the current in the main or controlling circuit is normal, the meter is balanced with its needle in central position between the two contacts $c'\ c''$ and out of contact with either of them; but when the current is varied either by an increase or a decrease the needle will be deflected and come in contact with one or the other of said contacts $c'\ c''$, accordingly as the variation is by way of increase or decrease, and thereby close the alarm-circuit and cause an alarm to be sounded. As before intimated, the invention is not limited to this particular mechanism for controlling the alarm-circuit; but, on the contrary, it comprehends any device, of whatever construction, that will be influenced by a variation in the current reaching it over the main circuit and when so influenced will cause an alarm to be given, it being the intention that the term "meter" as used in this specification shall comprehend any such mechanism. Nor is the invention limited to an alarm mechanism of the construction shown and described, any visual or audible alarm mechanism or signaling device that can be controlled by a "meter" within the meaning of this term as hereinafter used being within the scope of the invention. The needle of the meter may, if desired, be relied upon as a visible signal.

D is the battery of the main or controlling circuit, which circuit consists of a wire $D'$, leading from one pole of the battery, a switch $D^2$, carried by the armature $C^4$, a wire $D^3$, terminating at one end in a contact $d^3$, located in operative proximity to the switch $D^2$, whence said wire extends to the guarded structure, where it is connected with one of the binding-posts of a rheostat E, located at the guarded structure, a wire $D^4$, leading from the other binding-post of said rheostat to one of the binding-posts of a rheostat $e$, located at the station, a wire $D^5$, leading from the other binding-post of the rheostat $e$ to one of the binding-posts of the meter A, and a wire $D^6$, leading from the other binding-post of the meter back to the other pole of the battery. Each of the rheostats, considered alone, permutes in the sense that a given number of resistances may be arranged or combined in a greater number of orders or combinations, and the rheostats at the station and guarded structure, considered together, permute in the sense that their action is reciprocal, each complementing the other—that is to say, each of them is capable of both throwing in and throwing out resistance; but their construction and arrangement are such that the action of one complements the action of the other. If one throws resistance in the other throws it out, and vice versa, and these variations, which are alike in amount, are accomplished simultaneously, or practically so. The rheostats are operated by electromagnets F $f$, located on what is herein called the "switching circuit" and supplied with current from a battery G, located at the station. The switching-circuit is normally open and is made up of a wire $G'$, leading from one pole of the battery G to the magnet F, a wire $G^2$, leading from said magnet to the switch $D^2$, a wire $G^3$, terminating in a contact $g^3$, located in operative proximity to the switch $D^2$, whence said wire extends to the other pole of the battery, and a wire $G^4$, bridging the wires $G'$ and $G^2$, on which wire $G^4$ the magnet $f$ is located.

The switch $D^2$ is common to both the main circuit and the switching-circuit, and as a result of this when the switch is in position to close the switching-circuit it leaves the main circuit open, the main circuit being normally closed. By using such a switch common to both circuits I am enabled to use between the station and the guarded structure one and the same wire as a part of both circuits, and at the same time it provides means for opening the main circuit and holding it open during the intervals during which the switching-circuit is closed and the changing of the resistance in the main circuit is taking place. If the main circuit were left closed while the resistance is being changed, there would be a disturbance of the meter that would cause an alarm to be given. It is true that alarms that would be produced in this way would have characteristics that would enable the attendant to distinguish them from alarms caused by surreptitious meddling with the system; but still I prefer to avoid the giving of any alarms excepting when the system is tampered with, and hence I provide means for making the main circuit inoperative while changes in the resistance produced by the normal operation of the system are taking place.

It will be seen that the magnets F and $f$ are arranged in multiple, and this is preferred for the following reasons: If the main and the switching circuits were entirely separate and independent throughout and the magnets F and $f$ were arranged in series, the system could be crippled, so as to prevent it from producing any variations in the resistance, by simply cutting the switching-circuit at any one point. This done, it would be possible to ascertain the amount of resistance in circuit at the guarded structure and short-circuit the guarded structure by an instrument having a like resistance, and the system would thereby be rendered useless; but by arranging the magnets F and $f$ in multiple, even if the switching-circuit were entirely independent of the main circuit, the system could not be crippled in the manner described, for the reason that access cannot be had to that portion of the switching-circuit upon which the magnet $f$ is arranged, and consequently, even though the magnet F be cut out of circuit, each time the switching-circuit is closed the magnet $f$ will operate the rheostat $e$ and change the resistance at the station, and in the absence of a corresponding change at the guarded structure an alarm would be given. The only way to avoid this would be to put in circuit at the point where the guarded structure is short-circuited a rheostat constructed and arranged to operate precisely like the rheostat at the guarded structure; but in view of the complicated construction of this rheostat, the great number of its combinations, the facility with which the order of its combinations may be rearranged from time to time, and the fact that the arrangement of its combinations will be kept a secret, this would be next to impossible. The same result would follow if the magnets F and $f$ were located upon circuits that are entirely separate. A further protection to the switching-circuit is had by using one and the same wire for a portion of it and a portion of the main circuit.

If desired, the switch $D^2$ may be operated manually but I prefer to operate it by an electrical appliance which is controlled by a chronometer H or other time mechanism. Preferably this appliance consists of an electromagnet H', arranged in operative relation to the armature $C^4$, a wire $H^2$, which leads from said magnet to a ring $H^3$, having in it a number of holes or perforations $h^3$ for receiving a number of pins or contacts $H^4$, a switch $H^5$, operated by the chronometer, a wire $H^6$, leading from the switch to one pole of the battery C, (which is common to both the alarm-circuit and the chronometer-circuit,) and a wire $H^7$, leading from the other pole of the battery back to the magnet H'. Separate batteries may, if desired, be used for these two circuits; but since the alarm-circuit seldom needs any current I prefer to use one battery for both of them. By including the armature $C^4$ or a part carried thereby in the alarm-circuit and using this armature or part as a switch the alarm-circuit is opened at $c^3$ each time the chronometer-circuit is closed and the armature $C^4$ attracted. A pin $H^4$ may be placed in each of the perforations $h^3$, if desired, so that the changes will be made at regular intervals; but I prefer to leave the pins out of some of the perforations, so that the changes will be made at irregular intervals.

Coming now to the rheostats themselves, it may be stated that they are of similar construction, the only difference between them being that their contact-points are so connected with the resistances that as the switches reach said contact-points in succession resistance will be thrown in at one of the rheostats and out at the other, the variation at the two rheostats being alike in amount at any given operation, although the variations at successive operations may be different in amount and even in character—that is to say, at any given simultaneous operation of the two rheostats the variation is alike in amount, although it is by way of an increase in the resistance at one of them and a decrease at the other. At the next succeeding operation the amount of the variation at either of the instruments may be the same or more or less than it was at the preceding operation, but still alike in amount at the two rheostats. In other words, at any given operation the variation may be by way of an increase in the resistance in the rheostat at the guarded structure and a corresponding decrease in the resistance in the rheostat at the station, and at the next operation the variation may be by way of a decrease in the resistance in the rheostat at the guarded structure and a corresponding increase in the resistance in the rheostat at the station.

For the sake of brevity and clearness the following description will be confined to the rheostat which is located at the guarded structure, excepting when it becomes necessary to refer to the one located at the station, and similar parts of both will be indicated by similar reference letters and numerals, the prime-mark being added to the reference letters and numerals used to indicate the parts of the rheostat located at the station.

Upon a base 1 is built a box 2, to one of the sides 3 of which are secured blocks 4, to which latter is secured a bar extending parallel with the side 3 of the box. In this side of the box and in the bar 5 are journaled a train of intermeshing differential gear-wheels 6, 7, and 8. The first wheel of the train has formed upon or secured to it a ratchet-wheel 9, engaged by a dog 10, which is pivoted to one end of a lever 11, that is fulcrumed to a bracket 12 and carries at its other end an armature 13, located in the field of the magnet F. The dog 10 is held normally in engagement with the ratchet-wheel by a spring 14, which is secured to the lever and bears against the heel of the dog. When the armature 13 is attracted by the magnet F, the dog 10, being in engagement with the ratchet-wheel 9, turns the train of gear-wheels each in the direction of the arrow placed upon it, the movement of the entire train at each operation of the dog being limited to the number of degrees which are embraced between radial planes cutting two adjacent teeth of the ratchet-wheel by a stop-dog 15, which is carried by the lever 11 and engages the teeth of the first gear-wheel 6 of the train, the number of teeth on this wheel being the same as the number of teeth on the ratchet-wheel. Twenty are shown in the drawings; but, if desired, a greater or less number may be used without in any way departing from the spirit of the invention. When the magnet F is deënergized, a spring 16, engaging the lever 11, withdraws the armature and withdraws the dogs 10 and 15. The retrograde movement of the train of gear-wheels is prevented by a spring-dog 17, which is secured to the bar 5 and engages the teeth of the ratchet-wheel 9.

Arranged concentrically with the axis of the wheel 6 is a group of pins or contacts 18, which do not have contact with the wheel and are completely insulated from each other. Preferably this is accomplished by making the side 3 of the box of hard rubber or other insulating material (if desired, the entire box and its base may be constructed of the same material) and firmly setting the pins in perforations formed in it. The pins are disposed at equal distances apart and correspond in number with the teeth on the ratchet-wheel 9. Each of them is connected with one or another of six wires, numbered 19 to 24, inclusive. The wire 19 is connected directly with the wire $D^3$ of the main circuit, which latter also connects with one end of a resistance-coil 25, and the wires numbered 20 to 24, inclusive, are connected with said coil at successively-greater distances from the end with which the wires $D^3$ and 19 connect. This single coil 25, tapped in this manner, may be considered as a single resistance tapped at different points; but I prefer to consider it as a group of resistances the lesser of which are included in the greater. In other words, I prefer to consider that portion of the coil which is included between the wires $D^3$ and 20 as one resistance, that portion which is included between the wires $D^3$ and 21 another resistance, which includes or is in part made up of the first resistance, and so on, the entire coil being the greatest one of the group and including all of the others. Hence the term "resistance" (singular) as used in this specification must be understood as meaning so much of the coil 25 as is included between the wire $D^3$ and any one of the wires 20, 21, 22, 23, or 24 and disregarding all other of said wires, and the term "group of resistances" must be understood as meaning two or more of such resistances; but I desire to have it understood that in its broadest aspect the invention so far as it includes a group of resistances is not limited to this arrangement, in which the lesser are included in the greater—i. e., in series—but, on the contrary, a group of resistances, each of which is complete in itself and entirely separate from the others, is within its scope.

On the inner face of the wheel 6 is secured a switch 26, preferably consisting of a plate-spring which is always in contact with one or another of the contacts 18 and which comes in contact with them in succession as the wheel is rotated.

Arranged concentrically with the axis of the wheel 7 is a group of equidistant insulated contact-pins 180, the number of pins used in this group being different from the number used in the group already described. In the drawings I have shown nineteen; but this is an arbitrary selection, and any other number, excepting the exact number used in the group 18, may be used. The accomplishment of the objects of the invention necessitates differential groups of contact-points—i. e., groups no two of which contain the same number—and such an arrangement of mechanism that the switches of the several groups advance at each operation from one to another of the contact-points in succession. What I regard as the simplest and best way to accomplish this is to mount the switches on differential gear-wheels and to make the differentials of the several gear-wheels and the several groups of contacts agree. To be more explicit, in one group I have used twenty contacts and have provided means for moving the switch of this group through one-twentieth of a revolution at each operation, and in the other group I have used nineteen contacts and have provided means for moving the switch of this group of contacts through one-nineteenth of a revolution at each operation, so that each time the switch 26 advances from one contact to the next in the group 18 the switch 260, carried by the wheel 7, advances from one to the next contact of the group 180. The switch 260 is insulated from the wheel 7 by being secured to a block 27 of insulating material, which block is in turn secured to the wheel. Each of the contact-pins 180 is connected with one or another of six wires numbered, respectively, 190 200 210 220 230 240. The wire 190 is connected directly with the wire $D^4$ of the main circuit, which latter is also connected directly with one end of a resistance-coil 250, (like the coil 25,) and the wires 200, &c., are connected with said coil at successively-greater distances from the end with which the wires $D^4$ and 190 connect. The switch 260 has a heel portion 29, which constitutes a brush and has contact with an insulated metallic ring 30, which is secured to the side 3 of the box. Arranged concentrically with the axis of the wheel 8 is a group of equidistant insulated contact-pins 181, the number of pins used in this group (thirteen being shown) being different from the number used in either of the other groups. What has already been said about the differential arrangement of the pins of the two groups already described is here applicable.

Each of these pins is connected with one or another of four wires 191, 201, 211, and 221. The wire 191 is connected directly with one end of a resistance-coil 251 (like the coil 25) and a wire 31, the latter wire being also connected with said coil and with the ring 30. The wires 201, 211, and 221 are connected with the resistance-coil 251 at successively-greater distances from the end with which the wires 31 and 191 connect. A switch 261, in all respects similar to the switch 26, is secured to the wheel 8 and is adapted to come in contact with the contact-pins 181 in succession as the wheel 8 revolves.

The operation of the rheostat is as follows: With the parts in the positions shown in the drawings the course of the current coming from the main circuit over the wire $D^3$ is as follows: From the wire $D^3$ to the coil 25, over the coil 25 to the point of connection with the wire 23, over the wire 23 to the pin 18, from this pin to the switch 26, through the switch to the wheel 6, thence to the wheel 8 either through the wheel 7 or through the metallic bar 5, which is diagrammatically represented in Fig. 5 by a dotted line, from the wheel 8 to the switch 261, through the switch to the contact-pin 181, with which it is in contact, thence to the wire 221, through said wire to the extremity of the coil 251, thence through the entire coil to the wire 31, through said wire to the ring 30, from the ring 30 to the brush 29, through the brush to the switch 260, through the switch to the contact-pin 180, with which it is in contact, thence to the wire 200, through said wire to the coil 250, through said coil from the point at which the wire 200 connects to the wire $D^4$ of the main circuit, and through said wire to the rheostat e at the station. For the purpose of this description let it be assumed that each of the coils 25 and 250 represents a total resistance of one thousand ohms and the coil 251 five hundred ohms, that the coil 25 is tapped by the wires numbered 20 to 24, inclusive, at points representing resistances of one hundred, three hundred, five hundred, seven hundred, and one thousand ohms, respectively, and so with the coil 250, and that the coil 251 is tapped by the wires 201, 211, and 221 at points representing resistances of one hundred, three hundred, and five hundred ohms, respectively. With the parts in the positions shown in the drawings the total resistance in circuit at this rheostat E, which is located at the guarded structure, will be fifteen hundred ohms. When, however, the magnet F is energized, each of the switches 26, 260, and 261 will be advanced to the next contact-point of its group, and when this takes place the total resistance in circuit at this rheostat will be only four hundred ohms. At the next change produced by the operation of the magnet F it will be two thousand ohms, at the next six hundred, at the next one thousand, at the next eleven hundred, at the next twelve hundred, at the next twelve hundred, at the next four hundred, &c. Thus it will be seen the variations are by way of both increase and decrease, and by an accident of the construction shown the seventh operation of the rheostat will not produce any variation whatever in the resistance. Whatever be the action of this rheostat at the guarded structure, the rheostat at the station will complement it, so that while the resistance in local portions of the main circuit is constantly changing the resistance in the entire circuit remains constant. It is because of this reciprocal action of the two rheostats that they are herein termed "permutating" rheostats.

The sum of all the contacts in the three groups described is fifty-two. If these fifty-two contacts were all arranged in a single group and a single switch were used each complete cycle of operations of the instrument would produce fifty-two changes in the resistance, after which the same fifty-two changes would be repeated by each succeeding complete cycle of operations; but by arranging the contacts in a plurality of groups and using a plurality of switches the changes are permuted, so that with this same number of contacts, disposed as shown in the drawings, each complete cycle of operations of the instrument produces four thousand nine hundred and forty changes. It is not meant by this that four thousand nine hundred and forty different amounts of resistance are included in the cycle, but that the cycle includes four thousand nine hundred and forty changes, all of which must be known before the instrument can be defeated, which is just as effective as if there were four thousand nine hundred and forty different amounts of resistance.

It will be seen that each resistance of each group has a plurality of contacts, all connected with it at the same point, and by this means each resistance is used repeatedly in each cycle of operations. It will be seen also that in grouping the contacts the contacts of the several resistances are not arranged in the same order or succession as the resistances themselves are—that is to say, they are not arranged so that successive changes shall be always by way of an increase or always by way of a decrease. On the contrary, they are arranged irregularly, so that the changes shall vary irregularly from an increase to an increase or an increase to a decrease or a decrease to a decrease or a decrease to an increase, and this makes it more difficult for a meddler to anticipate the action of the system. It will be seen also that the several contacts of each resistance are not adjacent to each other, but are separated by contacts of another resistance or other resistances, and here again irregularity is preferable to regularity.

Having thus described my invention, the following is what I claim as new therein and desire to secure by Letters Patent:

1. In a burglar-alarm system, the combination with a main circuit and circuit-varying devices at the station and guarded structure respectively, of electrical appliances, including a switching-circuit extending to the guarded structure for operating the circuit-varying device at the guarded structure, electrical appliances for operating the circuit-varying device at the station, and means for causing an alarm to be given if the normal condition of the switching-circuit extending to the guarded structure is interfered with, substantially as set forth.

2. In a burglar-alarm system, the combination with a main circuit and circuit-varying devices arranged therein and located at the station and the guarded structure respectively, of electrical appliances for operating the circuit-varying devices, the appliance for operating the circuit-varying device at the station being arranged upon a circuit which is complete within the station, substantially as set forth.

3. In a burglar-alarm system, the combination with a main circuit and circuit-varying devices arranged therein and located at the station and guarded structure respectively, of electrical appliances for operating said circuit-varying devices, said electrical appliances including electromagnets arranged in multiple, substantially as set forth.

4. In an electrical burglar-alarm system, the combination with a main circuit, circuit-varying devices arranged therein, a switching-circuit, and means arranged thereon for operating the circuit-varying devices, of a switch common to and forming a part of both of said circuits, said switch being so disposed that when one of the circuits is open the other is closed, substantially as set forth.

5. In an electrical burglar-alarm system, the combination of a normally closed main circuit, alarm mechanism controlled thereby, means for varying the normal condition of the circuit, and a normally open switching-circuit for operating said circuit-varying means, said circuits including a switch which is common to both of them, of an automatic device for operating said switch, said switch being so disposed that when in one position the main circuit is closed and the switching-circuit is open and when in another position the main circuit is open and the switching-circuit is closed, and means for rendering the alarm mechanism inoperative while the main circuit is open at said switch, substantially as set forth.

6. In an electrical burglar-alarm system, the combination of a main circuit and a switching-circuit including a wire which forms a part of and is common to both of them, alarm mechanism controlled by the main circuit, means arranged upon the switching-circuit for varying the normal condition of the main circuit, and means for opening and closing said circuits reciprocally and holding each open while the other is closed, substantially as set forth.

7. In an electrical burglar-alarm system, the combination of a main circuit, a switching-circuit, said circuits including a wire common to both of them, circuit-varying devices arranged in the main circuit, electrical appliances arranged in the switching-circuit for operating the circuit-varying devices, and a switch common to both of said circuits so disposed that when one of them is open the other is closed, substantially as set forth.

8. In an electrical burglar-alarm system, the combination of a main circuit, alarm mechanism controlled thereby, a switching-circuit, means arranged upon the switching-circuit for varying the normal condition of the main circuit, a switch common to both of said circuits so disposed that when one is closed the other is open, and automatically-operating means for controlling said switch, substantially as set forth.

9. In an electrical burglar-alarm system, the combination with a main circuit, circuit-varying devices arranged therein, a switching-circuit, electrical appliances arranged therein for operating the circuit-varying devices, a switch common to both of said circuits so disposed that when one is open the other is closed, an electrical appliance for operating said switch and time mechanism for controlling said electrical appliance, substantially as set forth.

10. In an electrical burglar-alarm system, the combination of an alarm-circuit having a switch, a meter for controlling the alarm-circuit, a main circuit electrically connected with the meter, a switching-circuit, a switch common to both the main and switching circuits, and means including a chronometer for operating said switches so that when the main and alarm circuits are closed the switching-circuit is open and vice versa, substantially as set forth.

11. In an electrical burglar-alarm system, the combination of an alarm-circuit, a meter for controlling it, a main circuit electrically connected with the meter, circuit-varying devices arranged in the main circuit, a switching-circuit, electrical appliances arranged in said circuit for operating the circuit-varying devices, a switch common to both the main circuit and the switching-circuit, a chronometer, a circuit having a switch operated by the chronometer, a magnet arranged in the chronometer switch-circuit, and an armature arranged in the field of the magnet and controlling the switch which is common to the main and switching circuits, substantially as set forth.

12. In an electrical burglar-alarm system, the combination of an alarm-circuit having a switch which is normally closed, a normally open chronometer switching-circuit, a battery common to both of said circuits, and means arranged upon the chronometer switching-circuit for opening the switch of the alarm-circuit when the chronometer switching-circuit is closed, substantially as set forth.

13. In an electrical burglar-alarm system, the combination of a main circuit, a local alarm-circuit having a switch, a meter electrically connected with the main circuit and controlling a local alarm-circuit, a switching-circuit, including a part which is included also in the main circuit, means arranged upon the switching-circuit, for varying the normal condition of the main circuit, means for opening the main circuit when the switching-circuit is closed and holding it open while the switching-circuit is closed, and means for opening the switch of the alarm-circuit when the main circuit is opened as aforesaid, substantially as set forth.

14. In an electrical burglar-alarm system, the combination of a main circuit, a switching-circuit, a switch common to both of them and so disposed that it opens and closes them reciprocally, a local alarm-circuit having a switch, a chronometer switching-circuit, a battery common to the local alarm-circuit and the chronometer switching-circuit, and means arranged upon the chronometer switching-circuit for simultaneously operating both of the switches aforesaid so that the main and alarm circuits are simultaneously opened at their respective switches, substantially as set forth.

15. A rheostat having, in combination, a resistance, a movable contact member, and means for bringing in circuit the same resistance at different points in the movement of said contact member, substantially as set forth.

16. A rheostat having, in combination, a unitary resistance, a plurality of contacts with which one and the same terminal of said resistance is electrically connected, and a switch arranged in operative relation to said contacts, whereby said resistance is included in circuit at different points throughout the movement of the switch, substantially as set forth.

17. A rheostat having, in combination, a plurality of resistances, a plurality of contacts electrically connected with one and the same terminal of each of said resistances, and a switch arranged in operative relation to said contacts, substantially as set forth.

18. A rheostat having, in combination, a plurality of resistances electrically connected in series, a contact electrically connected with the terminal of each individual resistance, and a switch arranged in operative relation to said contacts, the order in which the contacts are arranged being different from that in which the resistances are arranged, substantially as set forth.

19. A rheostat having, in combination, a plurality of resistances electrically connected in series, a plurality of contacts electrically connected with one and the same terminal of each individual resistance, and a switch arranged in operative relation to said contacts, said contacts being arranged in irregular order, substantially as set forth.

20. A rheostat having, in combination, means for increasing the amount of resistance in circuit, means for decreasing the amount of resistance in circuit, and automatically-operating means for operating these two resistance-changing means for irregularly varying the resistance in circuit, substantially as set forth.

21. A rheostat having, in combination, automatically-operating means for changing the amount of the resistance in circuit, and means for irregularly varying the amount of successive changes, substantially as set forth.

22. A rheostat having, in combination, means for increasing the amount of resistance in circuit, means for decreasing the amount of resistance in circuit, automatically-operating means for irregularly operating these two resistance-changing means, and means for irregularly varying the amount of successive changes, substantially as set forth.

23. A rheostat having in combination a plurality of resistances, a plurality of contacts common to each of said resistances, the contacts of one resistance being disposed between the contacts of another resistance, and a switch arranged in operative relation to said contacts, substantially as set forth.

24. In a rheostat, the combination of a plurality of resistances differing in amount, a plurality of contacts arranged in a series and electrical connections between each of said resistances and one of the contacts, the contacts corresponding with the resistances in the order of their increase being irregularly disposed in the series so that successive contacts in the series are not connected with successively-increasing resistances, substantially as set forth.

25. A rheostat having in combination a plurality of resistances, a plurality of contacts common to each of said resistances, wires electrically connected with each of the resistances and each electrically connected with a plurality of the contacts, all of said contacts being arranged in a single group, and a switch arranged in operative relation to said contacts, substantially as set forth.

26. A rheostat having in combination a plurality of groups of resistances, a number of contacts arranged in a plurality of separate groups, corresponding with the groups of resistances, wires electrically connected with the resistances and each electrically connected with a plurality of the contacts in one of the groups, a plurality of switches, one for each group of contacts, and means for operating them, substantially as set forth.

27. A rheostat having, in combination, plurality of resistances and mechanism for including various permutations or combinations of them in circuit, said mechanism being differential whereby the changes in each complete cycle of operations may include all possible permutations or combinations of the resistances, substantially as set forth.

28. A rheostat having, in combination, a plurality of resistances, contacts arranged in a plurality of differential groups, and mechanism for including various permutations or combinations of the contacts of the several groups in circuit, said mechanism being differential whereby the changes in each complete cycle of operations may include all possible permutations or combinations of each contact of each group with every contact of another group, substantially as set forth.

29. A rheostat having, in combination, a plurality of resistances, contacts arranged in a plurality of differential groups, a plurality of switches adapted to have contact with the contacts of the several groups respectively, and differential mechanism whereby the relations of the several groups of contacts and their respective switches are changed so that at each operation the combination of contacts included in circuit is changed and so that a complete cycle of operations may include all possible permutations or combinations of each contact of each group with every contact of another group, substantially as set forth.

30. A rheostat having, in combination, a plurality of resistances, contacts arranged in a plurality of cyclic groups, and differential mechanism for making contact in succession with the successive contacts of each group at each operation, whereby the changes in each complete cycle of operation may include all possible permutations or combinations of each contact of each group with every contact of another group, substantially as set forth.

31. A rheostat having, in combination, a plurality of resistances, contacts arranged in a plurality of differential cyclic groups, a plurality of switches arranged in operative relation to the contacts of the several groups respectively, and differential mechanism for simultaneously moving all of said switches so that at each operation each is advanced from one contact to another of its group, whereby the several switches complete their respective cycles of operations at different periods and whereby each contact of each group is arranged in all possible combinations with every contact of another group, substantially as set forth.

32. A rheostat having, in combination, a group of resistances, a group of contacts electrically connected therewith, a switch arranged in operative relation to said contacts, a second group of resistances, a second group of contacts electrically connected therewith, a second switch electrically connected with the first switch and arranged in operative relation to the second group of contacts, the two groups of contacts being differential, and differential mechanism for operating the switches whereby each contact of each group may be arranged in all possible combinations with every contact of another group, substantially as set forth.

33. In a rheostat, the combination of a plurality of resistances, contacts electrically connected therewith and arranged in a plurality of differential groups, switches arranged in operative relation to said contacts, revoluble devices carrying said switches and differential mechanism for revolving said devices whereby each contact of each group may be arranged in all possible combinations with every contact of another group, substantially as set forth.

34. A rheostat having in combination a plurality of groups of resistances said groups being arranged in series, a number of contacts arranged in a plurality of differential groups, wires electrically connecting the contacts with the resistances, a plurality of switches arranged in operative relation to the contacts, a plurality of wheels carrying the switches and having differential gearing, and means for operating the wheels, substantially as set forth.

35. A rheostat having in combination a group of resistances, a plurality of wires leading therefrom, a group of contacts with which said wires are electrically connected, a switch arranged in operative relation to said contacts, a wheel by which said switch is carried, a second wheel, a second switch carried by the second wheel, means electrically connecting the first and second switches, a second group of contacts arranged in operative relation to the second switch, a plurality of wires electrically connected with said contacts, a second group of resistances with which said wires connect, a wire leading from the second group of resistances, a third switch with which said wire is electrically connected, a third wheel by which said switch is carried, a third group of contacts arranged in operative relation to said switch, a number of wires electrically connected with said contacts, and a third group of resistances with which said wires are connected, the contacts being arranged in differential groups, substantially as set forth.

CLYDE COLEMAN.

Witnesses:
L. M. HOPKINS,
N. C. GRIDLEY.